United States Patent
Sanada et al.

(10) Patent No.: US 10,815,366 B2
(45) Date of Patent: Oct. 27, 2020

(54) PROPYLENE RESIN COMPOSITION AND INJECTION MOLDED ARTICLE

(71) Applicant: Sumitomo Chemical Company, Limited, Tokyo (JP)

(72) Inventors: Toshiharu Sanada, Ichihara (JP); Toshiya Maruyama, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/949,151

(22) Filed: Apr. 10, 2018

(65) Prior Publication Data

US 2018/0298176 A1 Oct. 18, 2018

(30) Foreign Application Priority Data

Apr. 14, 2017 (JP) ................................. 2017-080587

(51) Int. Cl.
  *C08L 23/10* (2006.01)
  *C08L 23/12* (2006.01)

(52) U.S. Cl.
  CPC .............. *C08L 23/12* (2013.01); *C08L 23/10* (2013.01); *C08L 2205/025* (2013.01); *C08L 2205/035* (2013.01)

(58) Field of Classification Search
  CPC ...................................................... C08L 23/10
  See application file for complete search history.

(56) References Cited

U.S. PATENT DOCUMENTS

| | | | |
|---|---|---|---|
| 6,251,997 B1 * | 6/2001 | Imai ........................ | C08F 10/06 525/191 |
| 2009/0163666 A1 | 6/2009 | Lohse et al. | |
| 2010/0292371 A1 * | 11/2010 | Maruyama .............. | C08L 23/10 524/99 |
| 2015/0018474 A1 | 1/2015 | Nakajima | |

FOREIGN PATENT DOCUMENTS

| | | |
|---|---|---|
| EP | 3127701 A1 | 2/2017 |
| JP | 2006257131 A | 9/2006 |
| JP | 2015096586 A | 5/2015 |

OTHER PUBLICATIONS

Extended European Search Report dated Aug. 21, 2018 in EP Application No. 18167077.9.
Office Action dated May 20, 2020 in EP Application No. 18167077.9.

* cited by examiner

*Primary Examiner* — Vickey Nerangis
(74) *Attorney, Agent, or Firm* — Panitch Schwarze Belisario & Nadel LLP (57) ABSTRACT

The present invention relates to a propylene resin composition comprising a propylene-based polymer (component A) and an ethylene-α-olefin copolymer (component B), wherein a content of the component A and a content of the component B are 60 to 90 parts by mass and 10 to 40 parts by mass, respectively, with respect to 100 parts by mass in total of the component A and the component B, and a degree of orientation of a b-axis in an α crystal of the component A in a molded article that is obtained by injection molding the propylene resin composition into a mold cavity of 100 mm (width)×400 mm (length)×3 mm (thickness) under conditions of a cylinder temperature of 220° C., a mold temperature of 50° C. and an injection speed of 23 mm/sec is 85.0% or more.

8 Claims, 1 Drawing Sheet

PROPYLENE RESIN COMPOSITION AND INJECTION MOLDED ARTICLE

TECHNICAL FIELD

The present invention relates to a propylene resin composition and an injection molded article.

BACKGROUND

Molded articles formed from a propylene resin composition are used for automotive materials, household electrical appliances and the like. High dimensional stability is required of the molded article, and, for instance, in Patent Document 1, a molded article is described which has been obtained by heating and melting a polypropylene resin composition at a temperature of a melting point thereof or higher, cooling the composition to obtain a molded precursor in a solid state, and subsequently heating and compressing the molded precursor at a temperature of the melting point of the polypropylene resin composition or lower.

CITATION LIST

Patent Literature

[Patent Literature 1] Japanese Unexamined Patent Publication No. 2015-96586

SUMMARY

Molded articles used for automotive materials, materials for household electrical appliances and the like are generally molded by injection molding in many cases. Because of this, a propylene resin composition is required from which a molded article excellent in the dimensional stability can be produced by injection molding.

Then, an object of the present invention is to provide the propylene resin composition from which the molded article excellent in the dimensional stability can be produced by injection molding. Another object of the present invention is to provide an injection molded article excellent in the dimensional stability.

The present invention relates to a propylene resin composition comprising a propylene-based polymer (A) and an ethylene-α-olefin copolymer (B), the ethylene-α-olefin copolymer (B) not containing a monomer unit derived from propylene, wherein a content of the propylene-based polymer (A) and a content of the ethylene-α-olefin copolymer (B) are 60 to 90 parts by mass and 10 to 40 parts by mass, respectively, with respect to 100 parts by mass in total of the propylene-based polymer (A) and the ethylene-α-olefin copolymer (B), and a degree of orientation of a b-axis in an α crystal of the propylene-based polymer (A) in a molded article is 85.0% or more, wherein the molded article is obtained by injection molding the propylene resin composition into a mold cavity of 100 mm (width)×400 mm (length)×3 mm (thickness) under conditions of a cylinder temperature of 220° C., a mold temperature of 50° C. and an injection speed of 23 mm/sec, and the degree of orientation is an average of degrees of orientation obtained by a wide-angle X-ray analysis in which X-rays are incident on two directions vertical to a thickness direction of the molded article and orthogonal to each other.

The propylene resin composition of the present invention may be an aspect of further containing a filler (C), wherein a content of the filler (C) is 1 to 65 parts by mass, with respect to 100 parts by mass in total of the propylene-based polymer (A) and the ethylene-α-olefin copolymer (B).

The present invention also relates to an injection molded article consisting of the above propylene resin composition.

According to the present invention, the propylene resin composition can be provided from which a molded article excellent in the dimensional stability can be produced by injection molding. According to the present invention, the injection molded article can be provided that is excellent in dimensional stability.

DETAILED DESCRIPTION

[Definition]

In the present specification, the term "α-olefin" means an unsaturated aliphatic hydrocarbon having a carbon-carbon unsaturated double bond at the α-position.

In the present specification, the term "heterophasic propylene polymer material" means a mixture having a structure in which a polymer (II) containing a monomer unit derived from at least one α-olefin selected from the group consisting of ethylene and α-olefins having 4 or more and 12 or less carbon atoms and a monomer unit derived from propylene disperse in a matrix of a polymer (I) containing 80% by mass or more of a monomer unit derived from propylene (provided that total mass of polymer (I) is 100% by mass).

In the present specification, the term "ethylene-α-olefin copolymer" means a copolymer that contains a monomer unit derived from ethylene and a monomer unit derived from an α-olefin having 4 or more carbon atoms, and does not contain a monomer unit derived from propylene.

In the present specification, the term "xylene-insoluble component (also referred to as "component CXIS")" means a solid body that is a component insoluble in p-xylene that is contained in the heterophasic propylene polymer material and is obtained by the following method.

The solid body precipitates in a cooled solution obtained by cooling the solution to 20° C., which has been obtained by dissolving about 2 g of the heterophasic propylene polymer material in boiling p-xylene for 2 hours.

In the present specification, the term "xylene-soluble component (hereinafter referred to also as "component CXS") means a component other than the "component CXIS" in the heterophasic propylene polymer material. In the present specification, the term "propylene resin composition" means a composition containing the propylene-based polymer.

Hereafter, some embodiments of the present invention will be described in detail. However, the present invention is not limited to the following embodiments. In the present specification, the description of "lower limit to upper limit" which represents a numerical range represents "the lower limit or more and the upper limit or less", and the description of the "upper limit to the lower limit" represents "the upper limit or less and the lower limit or more". In other words, these descriptions represent numerical ranges containing the upper limit and the lower limit.

[Propylene Resin Composition]

The propylene resin composition according to the present embodiment (hereinafter simply referred to as resin composition) is the propylene resin composition containing the propylene-based polymer (A) and the ethylene-α-olefin copolymer (B), wherein a content of the propylene-based polymer (A) and a content of the ethylene-α-olefin copolymer (B) are 60 to 90 parts by mass and 10 to 40 parts by mass, respectively, with respect to 100 parts by mass in total of the propylene-based polymer (A) and the ethylene-α-olefin copolymer (B), and a degree of orientation of a b-axis in an α crystal of the propylene-based polymer (A) in a molded article is 85.0% or more, wherein the molded article is obtained by injection molding the propylene resin composition into a mold cavity of 100 mm (width)×400 mm (length)×3 mm (thickness) under conditions of a cylinder temperature of 220° C., a mold temperature of 50° C. and an injection speed of 23 mm/sec, and the degree of orientation is an average of degrees of orientation obtained by a wide-angle X-ray analysis in which X-rays are incident on two directions that are vertical to a thickness direction of the molded article and orthogonal to each other. A molded article excellent in the dimensional stability can be produced by an operation of molding such the propylene resin composition. If the resin composition is molded from which the molded article having the above described degree of orientation can be molded, the b-axis in the α crystal of the propylene-based polymer (A) can be highly oriented in the thickness direction (ND direction) of the molded article, and accordingly it is considered that the molded article excellent in the dimensional stability can be produced. The above described degree of orientation may be less than 100%. In addition, if the propylene resin composition of the present embodiment is used, a molded article can be produced by a simple method such as the injection molding which is generally adopted in the manufacture of molded articles for automobiles and the like. Specifically, if the propylene resin composition of the present embodiment is used, a molded article excellent in the dimensional stability can also be produced by a method other than a method of heating and compressing a molded precursor which has been obtained by injection molding or the like.

Here, the degree of orientation of the b-axis in the α crystal of the propylene-based polymer (A) is calculated with the use of a wide-angle X-ray scattering profile which has been obtained by irradiation with X-rays under the following measurement conditions, according to the following expression (1).

<Measurement Condition>
Model: Micromax-007 (trade name) made by Rigaku Corporation
X-ray source: CuKα ray
Beam diameter: 250 μm
Voltage: 40 kV
Electric current: 20 mA
Detector: X-ray photon counting type two-dimensional detector PILATUS
Measurement Method: Transmission Method $$\text{Degree of orientation (\%)} = \{(360 - \Sigma hw_{040})/360\} \times 100 \quad (1)$$

In Expression (1), $\Sigma hw_{040}$ represents the total value of the half-widths (unit: degrees) of all the peaks derived from a (040) plane of a component A, in a range of 0 to 360 degrees of the azimuth angle intensity distribution curve. However, when there is no peak, the $hw_{040}$ is not measured and the degree of orientation is not calculated. Usually, there are two peaks derived from the (040) plane of the propylene-based polymer, in the azimuth angle intensity distribution curve of the molded article formed of the propylene resin composition, and accordingly the half-width of each of the two peaks is determined and the total value of the two half-widths is represented by $\Sigma hw_{040}$.

The average of the degrees of orientation that are obtained by the wide-angle X-ray analysis in which X-rays incident on two directions that are vertical to the thickness direction of the molded article and orthogonal to each other is, for instance, a value that is obtained by: making the X-rays incident on two directions that are vertical to the thickness direction of the molded article and orthogonal to each other; measuring the respective wide angle X-ray scattering profiles; then, calculating the degrees of orientation in the respective directions with the use of the above described expression (1); and averaging the obtained degrees of orientation. The two directions that are vertical to the thickness direction of the molded article and orthogonal to each other are a flow direction (MD direction) of the resin at the time of the injection molding and a direction (TD direction) orthogonal to the MD direction. In addition, it is preferable, for instance, to subject the plurality of portions from the surface toward the center (half position of thickness of molded article) of the molded article to the wide-angle X-ray analysis, and calculate the degree of orientation in each of the directions, from the average value.

Hereinafter, each component represented by the above described "propylene-based polymer (A)" or the like is referred to simply as "component A" or the like.

Each component will be described below.

[Propylene-Based Polymer (A)]

A component A is a polymer having a monomer unit derived from propylene. Examples of the component A include a propylene homopolymer, a random copolymer of propylene and a monomer other than propylene, and a heterophasic propylene polymer material. The propylene resin composition of the present embodiment may contain only one component A, or two or more components. It is preferable for the component A to contain at least one type selected from the group consisting of the propylene homopolymer and the heterophasic propylene polymer material, from the viewpoints of rigidity and impact resistance of the molded article.

(Propylene Homopolymer)

In the case where the component A contains the propylene homopolymer, it is preferable for the intrinsic-viscosity number ([η]) of the propylene homopolymer to be 0.10 to 2.00 dL/g, and is more preferable to be 0.50 to 1.50 dL/g, and is further preferable to be 0.70 to 1.40 dL/g, from the viewpoints of fluidity at the time when the resin composition has melted and a toughness of the molded article.

In the present specification, the intrinsic-viscosity number (unit: dL/g) is a value which is measured at a temperature of 1.35° C. by using tetralin as a solvent, by the following method.

Reduced viscosity is measured at three points of concentrations of 0.1 g/dL, 0.2 g/dL, and 0.5 g/dL, by using an Ubbelohde viscometer. The intrinsic-viscosity number is determined by an extrapolation method of plotting the reduced viscosity against the concentration and extrapolating the concentration to zero. A method for calculating the intrinsic-viscosity number by the extrapolation method is described, for instance, in "Polymer Solutions, Polymer Experimentology 11" (published by Kyoritsu Shuppan Co., Ltd. 1982), page 491.

It is preferable for the molecular weight distribution (Mw/Mn) of the above described propylene homopolymer to be 3.0 or more, and is more preferable to be 6.0 or more. The molecular weight distribution of the component A may be 30.0 or less, and may also be 25.0 or less. The molecular weight distribution of the component A is preferably 3.0 to 30.0, and more preferably 6.0 to 25.0.

In the present specification, the molecular weight distribution refers to a ratio (Mw/Mn) of a weight average molecular weight (Mw) to a number average molecular weight (Mn), which is calculated with the use of the weight average molecular weight (Mw) and the number average molecular weight (Mn) that are measured by a gel permeation chromatography (GPC) on the following conditions.

Apparatus: HLC-8121. GPC/HT made by Tosoh Corporation

Separation column: 3 columns of GMHHR-H(S)HT made by Tosoh Corporation

Measurement temperature: 140° C.

Carrier: Orthodichlorobenzene

Flow rate: 1.0 mL/min

Sample concentration: about 1 mg/mL

Amount of injected sample: 400 μL

Detector: differential refractometry

Calibration curve preparation method: standard polystyrene was used.

The propylene homopolymer can be produced, for instance, by the polymerization of propylene with the use of a polymerization catalyst.

Examples of the polymerization catalyst include: a Ziegler type catalyst; a Ziegler-Natta type catalyst; a catalyst that consists of a chemical compound of a transition metal in Group 4 of the periodic table having a cyclopentadienyl ring, and of an alkylaluminoxane; a catalyst that consists of a chemical compound of a transition metal in Group 4 of the periodic table having a cyclopentadienyl ring, a chemical compound which reacts with the transition metal compound to form an ionic complex, and an organoaluminum compound; and a catalyst in which a catalytic component (a chemical compound of a transition metal in Group 4 of the periodic table having a cyclopentadienyl ring, chemical compound which forms an ionic complex, an organoaluminum compound and the like) is carried on an inorganic particle (silica, clay minerals or the like), and is denatured.

Such catalysts may be used as the above described polymerization catalysts as to be described in Japanese Unexamined Patent Publication. No. S61-218606, Japanese Unexamined Patent Publication No. H5-194685, Japanese Unexamined Patent Publication No. H7-216017, Japanese Unexamined Patent Publication No. H9-316147, Japanese Unexamined Patent Publication No. H10-212319, and Japanese Unexamined Patent Publication No. 2004-182981.

A polymer obtained by prepolymerizing propylene in the presence of the above described polymerization catalyst can also be used as the polymerization catalyst.

Examples of the polymerization methods include bulk polymerization, solution polymerization, and gas phase polymerization. Here, the bulk polymerization refers to a method in which the polymerization is carried out by using a liquid olefin as a medium at a polymerization temperature, and the solution polymerization is a method in which the polymerization is carried out in an inert hydrocarbon solvent such as propane, butane, isobutane, pentane, hexane, heptane and octane. In addition, the gas phase polymerization refers to a method of using a gaseous monomer as a medium, and polymerizing the gaseous monomers in the medium.

Examples of the manner of polymerization include batch system, a continuous system and combinations thereof. The manner of polymerization may be a multistage system in which a plurality of polymerization reaction vessels are connected in series.

From the viewpoint of industrial and economic superiority, a continuous type of gas phase polymerization method or a bulk-gas phase polymerization method in which a bulk polymerization method and a gas phase polymerization method are carried out continuously is preferable.

Various conditions (polymerization temperature, polymerization pressure, monomer concentration, amount of catalyst to be charged, polymerization time period and the like) in the polymerization step may be appropriately determined according to a molecular structure of an aimed polymer.

It is acceptable to dry the polymer at a temperature or lower at which the polymer melts, as needed after the polymerization step, so as to remove a remaining solvent contained in the polymer, oligomers of very low molecular weight, which are produced as by-products at the time of production, and the like. Examples of drying methods include the methods described in Japanese Unexamined Patent Publication No. S55-75410, Japanese Patent No. 2565753 and the like.

(Random Copolymer of Propylene and Monomer Other than Propylene)

A random copolymer of propylene and a monomer other than propylene contains a monomer unit that is derived from propylene and a monomer unit that is derived from a monomer other than propylene. It is preferable for the above described random copolymer to contain. 0.01% by mass or more and 20% by mass or less of the monomer unit that is derived from the monomer other than the propylene, based on the mass of the above described random copolymer.

Examples of monomers other than propylene include ethylene and α-olefins having 4 or more and 12 or less carbon atoms. Among the monomers, at least one monomer selected from the group consisting of ethylene and α-olefins having 4 to 10 carbon atoms is preferable, and at least one monomer selected from the group consisting of ethylene, 1-butene, 1-hexene and 1-octene is more preferable, and at least one monomer selected from the group consisting of ethylene and 1-butene is further preferable.

Examples of the above described random copolymers include propylene-ethylene random copolymers, propylene-1-butene random copolymers, propylene-1-hexene random copolymers, propylene-1-octene random copolymers, propylene-ethylene-1-butene random copolymers, propylene-ethylene-1-hexene random copolymers, and propylene-ethylene-1-octene random copolymers.

When the component A contains a random copolymer of the propylene and the monomer other than propylene, it is preferable for the intrinsic-viscosity number ([η]) of the above described random copolymer to be 0.10 to 2.00 dL/g, is more preferable to be 0.50 to 1.50 dL/g, and is further preferable to be 0.70 to 1.40 dL/g, from the viewpoint of the fluidity at the time when the resin composition has been melted.

It is preferable for the molecular weight distribution (Mw/Mn) of the above described random polymer to be 3.0 or more, and is more preferable to be 6.0 or more. The molecular weight distribution of the above described random polymer may be 30.0 or less, and may also be 25.0 or less. The molecular weight distribution of the random polymer is preferably 3.0 to 30.0, and more preferably 6.0 to 25.0.

The above described random copolymer can be produced, for instance, by the polymerization of the propylene and the monomer other than the propylene, according to a polymerization catalyst, a polymerization method and a manner of polymerization that can be all used in the production of the propylene homopolymer.

(Heterophasic Propylene Polymer Material)

The heterophasic propylene polymer material can be produced, for instance, by an operation of carrying out a first polymerization step of forming a polymer (I) and a second polymerization step of forming a polymer (II). Illustrations of the polymerization catalyst, the polymerization method and the manner of polymerization which are adopted in these polymerization steps are similar to those in the above description.

The polymer (I) may be, for instance, a propylene homopolymer, or may contain a monomer unit derived from a monomer other than the propylene. In the case where the polymer (I) contains the monomer unit derived from the monomer other than the propylene, the content may be, for instance, 0.01% by mass or more and less than 20% by mass, based on the total mass of the polymer (I).

Examples of the monomers other than the propylene include ethylene and α-olefins having 4 or more carbon atoms. Among the monomers, at least one selected from the group consisting of the ethylene and the α-olefin having 4 to 10 carbon atoms is preferable, and at least one selected from the group consisting of the ethylene, the 1-butene, the 1-hexene and the 1-octene is more preferable, and at least one selected from the group consisting of the ethylene and the 1-butene is further preferable.

Examples of the polymer containing a monomer unit derived from a monomer other than propylene include a propylene-ethylene copolymer, a propylene-1-butene copolymer, a propylene-1-hexene copolymer, a propylene-1-octene copolymer, a propylene-ethylene-1-butene copolymer, a propylene-ethylene-1-hexene copolymer and a propylene-ethylene-1-octene copolymer.

It is preferable for the polymer (I) to be a propylene homopolymer, a propylene-ethylene copolymer, a propylene-1-butene copolymer, a propylene-ethylene-1-butene copolymer, and is more preferable to be the propylene homopolymer, from the viewpoints of the dimensional stability of the molded article.

It is preferable for the content of the polymer (I) to be 50 to 99% by mass, and is more preferable to be 60 to 90% by mass, based on the total mass of the heterophasic propylene polymer material.

It is preferable that the polymer (II) contains 40% by mass or more of a monomer unit derived from at least one type of α-olefin selected from the group consisting of the ethylene and the α-olefins having 4 or more and 12 or less carbon atoms, and contains the monomer unit derived from the propylene.

In the polymer (II), a content of the monomer unit derived from at least one type of the α-olefin selected from the group consisting of the ethylene and the α-olefins having 4 or more and 12 or less carbon atoms may be 40 to 70% by mass, and may also be 45 to 60% by mass.

In the polymer (II), as for the at least one α-olefin selected from the group consisting of ethylene and α-olefins having 4 to 12 carbon atoms, at least one type selected from the group consisting of ethylene and α-olefins having 4 to 10 carbon atoms is preferable; at least one type selected from the group consisting of ethylene, 1-butene, 1-hexene, 1-octene and 1-decene is more preferable; and at least one type selected from the group consisting of ethylene and 1-butene is further preferable.

Examples of the polymer (II) include a propylene-ethylene copolymer, a propylene-ethylene-1-butene copolymer, a propylene-ethylene-1-hexene copolymer, a propylene-ethyl-ene-1-octene copolymer, a propylene-ethylene-1-decene, copolymer, a propylene-1-butene copolymer, a propylene-1-hexene copolymer, a propylene-1-octene copolymer and a propylene-1-decease copolymer. Among the polymers, it is preferable for the polymer to be a propylene-ethylene copolymer, a propylene-1-butene copolymer and a propylene-ethylene-1-butene copolymer, and is more preferable to be a propylene-ethylene copolymer.

It is preferable for the content of the polymer (II) to be 1 to 50% by mass, and is more preferable to be 10 to 40% by mass, based on the total mass of the heterophasic propylene polymer material.

It is preferable for the content of the component CXIS in the heterophasic propylene polymer material to be 50 to 99% by mass, and is more preferable to be 60 to 90% by mass, based on the total mass of the heterophasic propylene polymer material.

It is preferable for the content of the component CXS in the heterophasic propylene polymer material to be 1 to 50% by mass, and is more preferable to be 10 to 40% by mass, based on the total mass of the heterophasic propylene polymer material.

In the present embodiment, it is considered that the xylene-insoluble (CXIS) component in the heterophasic propylene polymer material is mainly composed of the polymer (I), and the xylene-soluble (CXS) component in the heterophasic propylene polymer material is mainly composed of the polymer (II).

Examples of the heterophasic propylene polymer material include a (propylene)-(propylene-ethylene) polymer material, a (propylene)-(propylene-ethylene-1-butene) polymer material, a (propylene)-(propylene-ethylene-1-hexene) polymer material, a (propylene)-(propylene-ethylene-1-octene) polymer material, a (propylene)-(propylene-1-butene) polymer material, a (propylene)-(propylene-1-hexene) polymer material, a (propylene)-(propylene-1-octene) polymer material, a (propylene)-(propylene-1-decene) polymer material, a (propylene-ethylene)-(propylene-ethylene) polymer material, a (propylene-ethylene)-(propylene-ethylene-1-butene) polymer material, a (propylene-ethylene)-(propylene-ethylene-1-hexene) polymer material, a (propylene-ethylene)-(propylene-ethylene-1-octene) polymer material, a (propylene-ethylene)-(propylene-ethylene-1-decene) polymer material, a (propylene-ethylene)-(propylene-1-butene) polymer material, a (propylene-ethylene)-(propylene-1-hexene) polymer material, a (propylene-ethylene)-(propylene-1-octene) polymer material, a (propylene-ethylene)-(propylene-1-decene) polymer material, a (propylene-1-butene)-(propylene-ethylene) polymer material, a (propylene-1-butene)-(propylene-ethylene-1-butene) polymer material, a (propylene-1-butene)-(propylene-ethylene-1-hexene) polymer material, a (propylene-1-butene)-(propylene-ethylene-1-octene) polymer material, a (propylene-1-butene)-(propylene-ethylene-1-decene) polymer material, a (propylene-1-butene)-(propylene-1-butene) polymer material, a (propylene-1-butene)-(propylene-1-hexene) polymer material, a (propylene-1-butene)-(propylene-1-octene) polymer material, a (propylene-1-butene)-(propylene-1-decene) polymer material, a (propylene-1-hexene)-(propylene-1-hexene) polymer material, a (propylene-1-hexene)-(propylene-1-octene) polymer material, a (propylene-1-hexene)-(propylene-1-decene) polymer material, a (propylene-1-octene)-(propylene-1-octene) polymer material, and a (propylene-1-octene)-(propylene-1-decene) polymer material.

Here, the description of "(propylene)-(propylene-ethylene) polymer material" means that "the polymer (I) is a propylene homopolymer, and the polymer (II) is a heterophasic propylene polymer material which is a propylene-ethylene copolymer". The description is similar in other similar expressions.

It is preferable for the heterophasic propylene polymer material to be the (propylene)-(propylene-ethylene) polymer material, the (propylene)-(propylene-ethylene-1-butene) polymer material, the (propylene-ethylene)-(propylene-ethylene) polymer material, the (propylene-ethylene)-(propylene-ethylene-1-butene) polymer material or the (propylene-1-butene)-(propylene-1-butene) polymer material, and is more preferable to be the (propylene)-(propylene-ethylene) polymer material.

It is preferable for the intrinsic-viscosity number ([η]I) of the polymer (I) to be 0.10 to 2.00 dL/g, is more preferable to be 0.50 to 1.50 dL/g, and is more preferable to be 0.70 to 1.40 dL/g.

It is preferable for the intrinsic-viscosity number ([η]II) of the polymer (II) to be 1.00 to 10.00 dL/g, is more preferable to be 2.00 to 10.00 dL/g, and is further preferable to be 2.00 to 8.00 dL/g.

It is preferable for a ratio ([η]II/[η]I) of the intrinsic-viscosity number (η)II of the polymer (II) to the intrinsic-viscosity number ([η]I) of the polymer (I) to be 1 to 20, is more preferable to be 1 to 10, and is further preferable to be 1 to 9.

Examples of methods of measuring the intrinsic-viscosity number ([η]I) of the polymer (I) include a method of forming the polymer (I) and then measuring the intrinsic-viscosity number of the polymer.

The intrinsic-viscosity number ([η]II) of the polymer (II) can be calculated, for instance, with the use of the intrinsic-viscosity number ([η] Total) of the heterophasic propylene polymer material, the intrinsic-viscosity number ([η]I) of the polymer (I), and the contents of the polymer (II) and the polymer (i), according to the following expression (6).

$$[\eta]II=([\eta]Total-[\eta]I\times XI)/XII \quad (6)$$

[η]Total: intrinsic-viscosity number of heterophasic propylene polymer material (dL/g)

[η]I: intrinsic-viscosity number (dL/g) of polymer (I)

XI: ratio of mass of polymer (I) to total mass of heterophasic propylene polymer material (mass of polymer (I)/mass of heterophasic propylene polymer material)

XII: ratio of mass of polymer (II) to total mass of heterophasic propylene polymer material (mass of polymer (II)/mass of heterophasic propylene polymer material)

Here, XI and XII can be determined from a substance balance at the time of the polymerization.

Incidentally, XII may be calculated with the use of the following expression after the quantity of melting heat of the polymer (I) and the quantity of melting heat of the heterophasic propylene polymer material have been measured.

$$XII=1-(\Delta Hf)T/(\Delta Hf)P$$

(ΔHf)T: quantity of inciting heat (J/g) of heterophasic propylene polymer material (ΔHf)P: quantity of melting heat (J/g) of polymer (I)

It is preferable for the intrinsic-viscosity number ([η] CXIS) of the component CXIS to be 0.10 to 2.00 dL/g, is more preferable to be 0.50 to 1.50 dL/g, and is more preferable to be 0.70 to 1.40 dL/g.

It is preferable for the intrinsic-viscosity number ([η] CXS) of the component CXS to be 1.00 to 10.00 dL/g, is more preferable to be 2.00 to 10.00 dL/g, and is further preferable to be 2.00 to 8.00 dL/g.

It is preferable for a ratio ([η]CXS/[η]CXIS) of the intrinsic-viscosity number ([η]CXS) of the component CXS to the intrinsic-viscosity number ([η]CXIS) of the component CXIS to be 1 to 20, is more preferable to be 1 to 10, and is further preferable to be 1 to 9.

It is preferable for a molecular weight distribution (Mw (I)/Mn(I)) of the polymer (I) to be 3.0 or more, and is more preferable to be 6.0 or more.

It is preferable for a molecular weight distribution (Mw (CXIS)/Mn(CXIS)) of the component CXIS to be 3.0 or more, and is more preferable to be 6.0 or more.

It is preferable for the isotactic pentad fraction (also referred to as "mmmm" fraction) of the component A is to be 0.950 or more and is more preferable to be 0.970 or more, from the viewpoint of rigidity and dimensional stability of the molded article formed from the resin composition. The isotactic pentad fraction of the component A may be, for instance, 1.000 or less.

The isotactic pentad fraction means an isotactic fraction in a pentad unit. In other words, the isotactic pentad fraction indicates a content of a structure in which five monomer units that are derived from propylene are continuously meso-bonded in terms of pentad units. Incidentally, when the component of interest is a copolymer, the isotactic pentad fraction means a value that is measured for the chain of monomer units which are derived from propylene.

In the present specification, the isotactic pentad fraction refers to a value that is measured by the $^{13}$C-NMR spectrum. Specifically, a ratio of an area of an mmmm peak with respect to an area of the total absorption peak in a methyl carbon region which is obtained by the $^{13}$C-NMR spectrum is defined as the isotactic pentad fraction. Incidentally, a method for measuring the isotactic pentad fraction by the $^{13}$C-NMR spectrum is described, for instance, in Macromolecules, 6, 925 (1973) written by A. Zambelli and others. However, absorption peaks obtained by the $^{13}$C-spectrum are attributed to the description of Macromolecules, 8, 687 (1975).

It is preferable for a melt flow rate of the component A at a temperature of 230° C. and at a load of 2.16 kgf to be 5 g/10 min or more, is more preferable to be 20 g/10 min to 300 g/10 min, from the viewpoint of moldability of the resin composition.

In the present specification, the melt flow rate refers to a value measured in accordance with JIS K 7210. In addition, the melt flow rate may be hereinafter referred to as MFR.

Such a method is not limited in particular as to set the degree of orientation of the b-axis in the α crystal of the propylene-based polymer (A) in the molded article that is obtained by injection molding the propylene resin composition into a mold cavity of 100 mm (width)×400 mm (length)×3 mm (thickness) under the conditions of a cylinder temperature of 220° C., a mold temperature of 50° C. and an injection speed of 23 mm/sec, at 85.0% or more in average of degrees of orientation, which are obtained by the wide-angle X-ray analysis in which X-rays are incident on two directions that are vertical to the thickness direction of the above described molded article and orthogonal to each other; but, for instance, such a method is considered as to adjust a blending ratio of the propylene-based polymer (A) and the ethylene-α-olefin copolymer (B), the type of the propylene-based polymer (A), and the mass ratio of the monomer unit derived from the propylene to the total mass of the propylene-based polymer (A) and the ethylene-α-olefin copolymer (B). It is preferable that the propylene resin composition according to the present embodiment contains both of the propylene homopolymer and the heterophasic propylene polymer material as the propylene-based polymer (A), from the viewpoint of the above described degree of orientation. As for the propylene resin composition according to the present embodiment, when the content of the ethylene-α-olefin copolymer (B) contained in the propylene resin composition is determined to be 100% by mass, the content of the polymer (II) in the heterophasic propylene polymer material may be more than 0 and 50% by mass or less, may be 5 to 40% by mass, or may be 10 to 25% by mass, from the viewpoint of the above described degree of orientation. It is preferable that the content of the heterophasic propylene polymer material contained in the propylene resin composition according to the present embodiment is determined so as to satisfy the above described range.

[Ethylene-α-Olefin Copolymer (B)]

In the component B, when the total mass of the component B is determined to be 100% by mass, the total of the contents of the monomer units may be 100% by mass, which are derived from ethylene contained in the component B, and derived from an α-olefin having 4 or more carbon atoms contained therein, respectively.

Examples of the α-olefins having 4 or more carbon atoms include α-olefins having 4 to 12 carbon atoms. Examples of the α-olefins having 4 to 12 carbon atoms include 1-butene, 1-pentene, 1-hexene, 4-methyl-1-pentene, 1-octene and 1-decene. Among the α-olefins, the 1-butene, the 1-hexene and the 1-octene are preferable. The above described α-olefins may be α-olefins having a cyclic structure such as vinyl cyclopropane and vinyl cyclobutane.

Examples of the component B include an ethylene-1-butene copolymer, an ethylene-1-hexene copolymer, an ethylene-1-octene copolymer, an ethylene-1-decene copolymer, an ethylene-(3-methyl-1-butene) copolymer, and a copolymer of ethylene and an α-olefin having the cyclic structure.

In the component B, it is preferable for a content of a monomer unit derived from the α-olefins having 4 or more carbon atoms to be 1 to 49% by mass, is more preferable to be 5 to 49% by mass, and is further preferable to be 24 to 49% by mass, based on the total mass of the component B.

It is preferable for a melt flow rate of the component B at a temperature of 230° C. and a load of 2.16 kgf to be 0.1 g/10 min to 80 g/10 min.

It is preferable for a density of the component B to be 0.850 to 0.890 g/cm$^3$, is more preferable to be 0.850 to 0.880 g/cm$^3$, and is further preferable to be 0.855 to 0.870 g/cm$^3$, from the viewpoint of an impact resistance of the molded article.

The component B can be produced by a polymerization of ethylene and an α-olefin having 4 or more carbon atoms, with the use of a polymerization catalyst.

Examples of the polymerization catalysts include homogeneous catalysts represented by a metallocene catalyst, and Ziegler-Natta type catalysts.

Examples of the homogeneous catalysts include: a catalyst that consists of a chemical compound of a transition metal in Group 4 of the periodic table having a cyclopentadienyl ring, and of an alkylaluminoxane; a catalyst that consists of a chemical compound of a transition metal in Group 4 of the periodic table having a cyclopentadienyl ring, a chemical compound which reacts with the transition metal compound to form an ionic complex, and an organoaluminum compound; and a catalyst in which a catalytic component (a chemical compound of a transition metal in Group 4 of the periodic table having a cyclopentadienyl ring, a chemical compound which forms an ionic complex, an organoaluminum compound and the like) is carried on an inorganic particle (silica, clay minerals or the like), and is denatured.

Examples of the Ziegler-Natta type catalysts include a catalyst obtained by combining a titanium-containing solid transition metal component with an organometallic component.

A commercialized product may be used for the component B. Examples of the commercially available component B include: ENGAGE (registered trademark) made by Dow Chemical Japan Ltd.; TAFMER (registered trademark) made by Mitsui Chemicals, Inc.; NEO-ZEX (registered trademark) and ULTZEX (registered trademark) made by Prime Polymer Co., Ltd.; and EXCELLEN FX (registered trademark), SUMIKATHENE (registered trademark) and ESPRENE SPO (registered trademark) made by Sumitomo Chemical Company, Limited.

In the propylene resin composition of the present embodiment, the content of the component A may be 60 to 80 parts by mass, or may be 60 to 70 parts by mass, with respect to 100 parts by mass in total of the component A and the component B, from the viewpoint of the dimensional stability of the molded article.

In the propylene resin composition of the present embodiment, the content of the component B may be 20 to 40 parts by mass, or may be 30 to 40 parts by mass, with respect to 100 parts by mass in total of the component A and the component B, from the viewpoint of the dimensional stability of the molded article.

[Filler (C)]

The propylene resin composition of the present embodiment may further contain a filler (C).

Examples of the component C include an inorganic filler and an organic filler. The propylene resin composition of the present embodiment may contain only one component C, or may contain two or more components.

Examples of the inorganic fillers include glass, silicate mineral, alumina, silica, silicon dioxide, titanium oxide, iron oxide, aluminum oxide, magnesium oxide, antimony oxide, barium ferrite, strontium ferrite, beryllium oxide, magnesium hydroxide, aluminum hydroxide, basic magnesium carbonate, calcium carbonate, magnesium carbonate, carbonate mineral, calcium sulfate, magnesium sulfate, basic magnesium sulfate, calcium sulfite, carbon black and cadmium sulfide.

Examples of the organic fillers include polyesters, aromatic polyamides, cellulose and vinylon.

A shape of the filler may be a plate shape, a needle shape, or a fibrous shape.

It is preferable for the component C to be an inorganic filler, and is more preferable to be talc which is a plate-like silicate mineral, from the viewpoints of the rigidity, impact resistance and dimensional stability of the molded article.

It is preferable for an average particle diameter D50[L] of the component C to be 20.0 μm or less, and is more preferable to be 15.0 μm or less, from the viewpoints of the rigidity, impact resistance and dimensional stability of the molded article. The average particle diameter D50[L] of the component C may be 2.0 μm or more, or may be 4.0 μm or more. It is preferable for the average particle diameter D50[L] of the component C to be 2.0 to 20.0 μm, is more preferable to be 4.0 to 15.0 μm.

It is preferable for the average particle diameter D50[S] of the component C to be 5.0 μm or less, and is more preferable to be 3.0 μm or less, from the viewpoints of the rigidity, impact resistance and dimensional stability of the molded article. The average particle diameter D50[S] of the component C may be 0.5 μm or more, or may be 1.0 μm or more.

It is preferable for the average particle diameter D50[S] of the component C to be 0.5 to 5.0 μm, and is more preferable to be 1.0 to 3.0 μm.

D50[L]/D50[S] which is a ratio of the average particle diameter D50[L] of the component C to the average particle diameter D50[S] thereof may be 1.5 or more, or may be 2.5 or more, from the viewpoints of the rigidity and dimensional stability of the molded article. D50[L]/D50[S] may be 10 or less, or may be 8 or less. D50[L]/D50[S] may be 1.5 to 10, or may be 2.5 to 8.

Here, in the present specification, the "average particle diameter D50[L]" is determined on the basis of volume-based particle size distribution measurement data which has been measured by a laser diffraction method according to the method specified in JIS R 1629, and means a particle diameter (50% equivalent particle diameter) where the number of particles accumulated from the side of smaller particle diameter has reached 50% in the particle diameter distribution measurement data. The particle diameter defined in the above way is generally referred to as "50% equivalent particle diameter", and is represented by "D50".

In the present specification, the "average particle diameter D50[S]" is determined on the basis of volume-based particle size distribution measurement data that has been measured by a centrifugal sedimentation method according to the method specified in JIS R 1619, which means a particle diameter (50% equivalent particle diameter) where the number of particles accumulated from the side of smaller particle diameter has reached 50% in the particle diameter distribution measurement data.

It is preferable that the propylene resin composition of the present embodiment contains the component C, and the content of the component C is 1 to 65 parts by mass with respect to 100 parts by mass in total of the component A and the component B, from the viewpoint of the dimensional stability of the molded article.

The content of the component C may be 10 to 60 parts by mass, or may be 20 to 55 parts by mass, with respect to 100 parts by mass in total of the component A and the component B, from the viewpoint of the dimensional stability of the molded article.

In the propylene resin composition of the present embodiment, the content of the component A may be 20 to 90% by mass, 40 to 75% by mass, or 40 to 60% by mass, based on the total mass of the propylene resin composition.

In the propylene resin composition of the present embodiment, the content of the component B may be 10 to 40% by mass, or 15 to 25% by mass, based on the total mass of the propylene resin composition.

In the propylene resin composition of the present embodiment, the content of the component C may be 0 to 40% by mass, 10 to 35% by mass, or 20 to 35% by mass, based on the total mass of the propylene resin composition.

In the propylene resin composition of the present embodiment, it is preferable that the total of the content of the component A and the content of the component B is 50% by mass or more, based on the total mass of the propylene resin composition.

In the propylene resin composition of the present embodiment, it is preferable that the total content of the content of the component A, the content of the component B and the content of the component C is 90% by mass or more, based on the total mass of the propylene resin composition.

It is preferable for a melt flow rate of the propylene resin composition of the present embodiment at a temperature of 230° C. and a load of 2.16 kgf to be 1.5 g/10 min or more, from the viewpoint of the moldability of the resin composition.

The propylene resin composition of the present embodiment can be obtained by melt-kneading each component of the raw material. The temperature at the time of melt-kneading may be 180° C. or higher, 180 to 300° C., or 180 to 250° C.

For melt-kneading, a Banbury mixer, a single screw extruder, a twin-screw co-rotating extruder and the like can be used.

The order of kneading each of the components of the raw materials is not limited in particular. For instance, it is acceptable to collectively knead the component A, the component B and the component C, or to knead a part of the components of the component A, the component B and the component C and then knead the obtained kneaded article and the other components.

There is no particular restriction on a shape of the propylene resin composition, but the propylene resin composition may be, for instance, in a form of a strand, a sheet, a flat plate and a pellet. The pellet-like resin composition can be produced, for instance, by forming a strand-like resin composition and cutting it into an appropriate length.

It is preferable for the shape of the resin composition which is before being molded into a molded article is in the form of a pellet having a length of about 1 to 50 mm, from the viewpoint of the moldability of the resin composition and the production stability in the case in which the molded article is produced.

The propylene resin composition of the present embodiment may contain components other than the above described components. Examples of such components include neutralizing agents, antioxidants, ultraviolet absorbers, nucleating agents, lubricants, antistatic agents, anti-blocking agents, processing aids, organic peroxides, colorants (inorganic, pigments, organic pigments and pigment dispersants), foaming agents, foam nucleating agents, plasticizers, flame retardants, crosslinking agents, crosslinking aids, brightening agents, antibacterial agents and light diffusing agents. The propylene resin composition of the present embodiment may contain only one kind of these components, or may contain two or more kinds of these components.

The propylene resin composition of the present embodiment can be used as a material for forming a molded article by being molded. It is preferable for the propylene resin composition of the present embodiment to be used as a material to be injection molded. One example of an injection molded article will be described below which is produced by using the propylene resin composition of the present embodiment as the material to be injection molded.

[Injection Molded Article]

The injection molded article of the present embodiment consists of the propylene resin composition of the present embodiment. Such an injection molded article is excellent in the dimensional stability.

The above injection molded article can be produced by an injection molding method. Examples of the injection molding method include a general injection molding method, an injection foam molding method, a supercritical injection foam molding method, an ultrahigh-speed injection molding method, an injection compression molding method, a gas assisted injection molding method, a sandwich molding method, a sandwich foam molding method, and insert/outsert molding methods. The shape of the injection molded article is not limited in particular.

The injection molded article according to the present embodiment can be preferably used, for instance, in applications for automotive materials, applications for household electrical appliance, and applications for containers, and is suitable for the application for the automotive interior/exterior, among the applications. Examples of the automotive interior/exterior parts include a door trim, a pillar, an instrument panel and a bumper.

EXAMPLES

The present invention will be described more specifically with reference to examples. However, the present invention is not limited to these examples.

In the Examples and Comparative Examples, the following raw materials were used.

[Component A: Propylene-Based Polymer]

The following propylene-based polymers ((A-1) to (A-6)) were prepared as the component A.

(A-1) (Propylene)-(Propylene-Ethylene) Polymer Material

The (propylene)-(propylene-ethylene) polymer material was produced by a gas phase polymerization method in the presence of a polymerization catalyst which was obtained according to the method described in Example 1 of Japanese Unexamined Patent Publication No. 2004-182981.

MFR (measured at temperature of 230° C. and load of 2.16 kgf): 51 g/10 min

Intrinsic-viscosity number: ([η]CXIS) 0.97 dL/g and ([η]CXS) 2.44 dL/g

Isotactic pentad fraction: 0.9785
Amount of component CXIS: 74.1% by mass
Mw/Mn of component CXIS: 5.1
Amount of component CXS: 25.9% by mass
Ethylene content in propylene-ethylene random copolymer: 31.3% by mass (A-2) (Propylene)-(Propylene-Ethylene) Polymer Material MFR (measured at temperature of 230° C. and load of 2.16 kgf): 38 g/10 min Intrinsic-viscosity number: ([η]CXIS): 1.03 dL/g, and ([η]CXS): 2.07 dL/g Isotactic pentad fraction: 0.9776
Amount of component CXIS: 69.5% by mass
Mw/Mn of component CXIS: 5.4
Amount of component CXS: 30.5% by mass
Ethylene content in propylene-ethylene random copolymer: 45.5% by mass (A-3) (Propylene)-(Propylene-Ethylene) Polymer Material The (propylene)-(propylene-ethylene) polymer material was produced by a gas phase polymerization method in the presence of a polymerization catalyst which was obtained according to the method described in Example 1 of Japanese Unexamined Patent Publication No. 2004-182981.

MFR (measured at temperature of 230° C. and load of 2.16 kgf): 25 g/10 min

Intrinsic-viscosity number: ([η]CXIS) 1.32 dL/g, and ([η]CXS): 2.31 dL/g

Isotactic pentad fraction: 0.9755
Amount of component CXIS: 77.4% by mass
Mw/Mn of component CXIS: 9.5
Amount of component CXS: 22.6% by mass
Ethylene content in propylene-ethylene random copolymer: 49.1% by mass (A-4) (Propylene)-(Propylene-Ethylene) Polymer Material The (propylene)-(propylene-ethylene) polymer material was produced by a gas phase polymerization method in the presence of a polymerization catalyst which was obtained according to the method described in Example 1 of Japanese Unexamined Patent Publication No. 2004-182981.

MFR (measured at temperature of 230° C. and load of 2.16 kgf): 29 g/10 min

Intrinsic-viscosity number: ([η]CXIS): 1.20 dL/g, and ([η]CXS): 3.06 dL/g

Isotactic pentad fraction: 0.9849
Amount of component CXIS: 82.7% by mass
Mw/Mn of component CXIS: 6.2
Amount of component CXS: 17.3% by mass
Ethylene content in propylene-ethylene random copolymer: 51.4% by mass (A-5) Propylene Homopolymer The propylene homopolymer was produced by a gas phase polymerization method in the presence of a polymerization catalyst which was obtained according to the method described in Example 1 of Japanese Unexamined Patent Publication No. 2004-182981.

MFR (measured at temperature of 230° C. and load of 2.16 kgf): 1.07 g/1.0 min

Intrinsic-viscosity number ([η]): 0.92 dL/g
Isotactic pentad fraction: 0.9811
Mw/Mn: 5.4

(A-6) Propylene Homopolymer

The propylene homopolymer was produced by a gas phase polymerization method in the presence of a polymerization catalyst which was obtained according to the method described in Example 1 of Japanese Unexamined Patent Publication No. 2004-182981.

MFR (measured at temperature of 230° C. and load of 2.16 kgf): 97 g/10 min

Intrinsic-viscosity number ([η]): 1.08 dL/g
Isotactic pentad fraction: 0.9778
Mw/Mn: 9.8

In addition, in the (A-1) to (A-4), the ethylene content in the propylene-ethylene random copolymer refers to an ethylene content in the polymer (II) (content of a monomer unit derived from ethylene, based on total mass of polymer (II)).

The MFR, the intrinsic-viscosity number and the isotactic pentad fraction were measured according to the above-mentioned methods, and the contents of the component CXIS and the component CXS, and the ethylene content and the molecular weight distribution in the polymer (II) were calculated according to the following methods.

(Contents of Component CXIS and Component CXS)

The heterophasic propylene polymer material in an amount of 2 g was weighed (hereinafter, "mass of heterophasic propylene polymer material" will be referred to as "a"), and was heated and dissolved in boiling xylene for 2 hours. Then, the resultant liquid was cooled to 20° C., and filtered with the use of filter paper. The filtered filtrate was concentrated under reduced pressure by a rotary evaporator, and the component CXS was obtained. The obtained component CXS was weighed ("mass of component CXS" will be referred to as "b"). The contents of the component CXIS and the component CXS in the heterophasic propylene polymer material were calculated according to the following expressions, with the use of the numerical values a and b. In addition, the solid matter remaining on the filter paper was dried in a vacuum, and the component CXIS was obtained. The obtained component CXIS was used for the evaluation of the molecular weight distribution.

amount of component CXS (% by mass)=(b/a)×100 amount of component CXIS (% by mass)=100−
amount of component CXS (% by mass)

(Ethylene Content in Polymer (II))

The ethylene content in the polymer (II) was determined on the basis of the report by Kakugo and others (Macromolecules, 15, 1150-1152 (1982)), from the $^{13}$C-NMR spectrum which was measured under the following conditions. The $^{13}$C-NMR spectrum was measured under the following conditions with the use of a sample in which approximately 200 mg of the heterophasic propylene polymer material was uniformly dissolved in 3 mL of orthodichlorobenzene in a test tube with a diameter of 10 mm.

Measurement Temperature: 135° C.
Pulse repetition time period: 10 seconds
Pulse width: 45°
Number of integration times: 2500 times
(Molecular Weight Distribution)

The molecular weight distribution of the propylene homopolymer was determined by the operations of measuring the weight average molecular weight (Mw(A)) and the number average molecular weight (Mn(A)) of the propylene homopolymer by GPC, and calculating a ratio (Mw/Mn) of Mw to Mn. The molecular weight distribution of the component CXIS was determined by the operations of measuring the weight average molecular weight (Mw (A)) and the number average molecular weight (Mn(A)) of the component CXIS which was obtained by the above described operations, by GPC, and calculating the ratio (Mw/Mn) of Mw to Mn. Incidentally, measurement conditions of the GPC are as described above.

[Component B: Ethylene-α-Olefin Copolymer]

The following ethylene-α-olefin copolymers (B-1) and (B-2) were prepared as the component B. Incidentally, the MFR was measured according to the above described method.

(B-1) Ethylene-1-Butene Copolymer
"ENR 7467" made by The Dow Chemical Company
Density: 0.862 g/cm$^3$
MFR (measured at temperature of 230° C. and load of 2.16 kgf): 2.5 g/10 min (B-2) Ethylene-1-Octene Copolymer
"EG 8842" made by The Dow Chemical Company
Density: 0.857 g/cm$^3$
MFR (measured at temperature of 230° C. and load of 2.16 kgf): 2.7 g/10 min.

[Component C: Filler]

The following filler ((C-1)) was prepared as the component C.

(C-1) Talc
"HARW 92" made by Imerys
Average particle diameter D50[L] (laser diffraction method and 50% equivalent particle diameter): 11.4 μm
Average particle diameter D50[S] (centrifugal sedimentation method and 50% equivalent particle diameter): 2.54 μm Here, the average particle diameter D50[L] of the talc was measured with the use of Microtrac Particle Size Analyzer MT-3300EXII made by Nikkiso Co., Ltd. according to the method specified in JIS R 1629, after the particles were dispersed under the following condition.

(Particles Dispersing Treatment)
Dispersion medium: Ethanol
Apparatus: Homogenizer
Output power: 40 W
Treating time: 10 minutes In addition, the D50[S] was measured with the use of a centrifugal sedimentation type particle size distribution analyzer SA-CP3 made by Shimadzu Corporation according to the method specified in JIS R 1619, after the particles were dispersed under the following condition.

(Particles Dispersing Treatment)
Dispersion medium: Ethanol
Apparatus: W-113MkII made by Honda Electronics Co., Ltd.
Output power: 110 W 24 kHz
Treating time: 10 minutes Examples 1 to 3 and Comparative Examples 1 to 3

[Production of Propylene Resin Composition]

The propylene-based polymers (A-1), (A-2), (A-3), (A-4), (A-5) and (A-6), the ethylene-α-olefin copolymers (B-1) and (B-2) and the filler (C-1) were prepared in amounts shown in Table 1 and Table 2.

The respectively prepared components were uniformly premixed with a Henschel mixer or a tumbler, and then were kneaded and extruded with the use of a twin-screw kneading extruder (TEX 44αII-49BW-3V type made by Japan Steel Works, Ltd.) at an extrusion amount of 70 kg/hr, 200° C. and a screw speed of 300 rpm, under vent suction, and resin compositions were produced. Physical properties of the obtained resin compositions are shown in the following Table 1 and Table 2.

[Production of Injection Molded Article]

Figure 1:
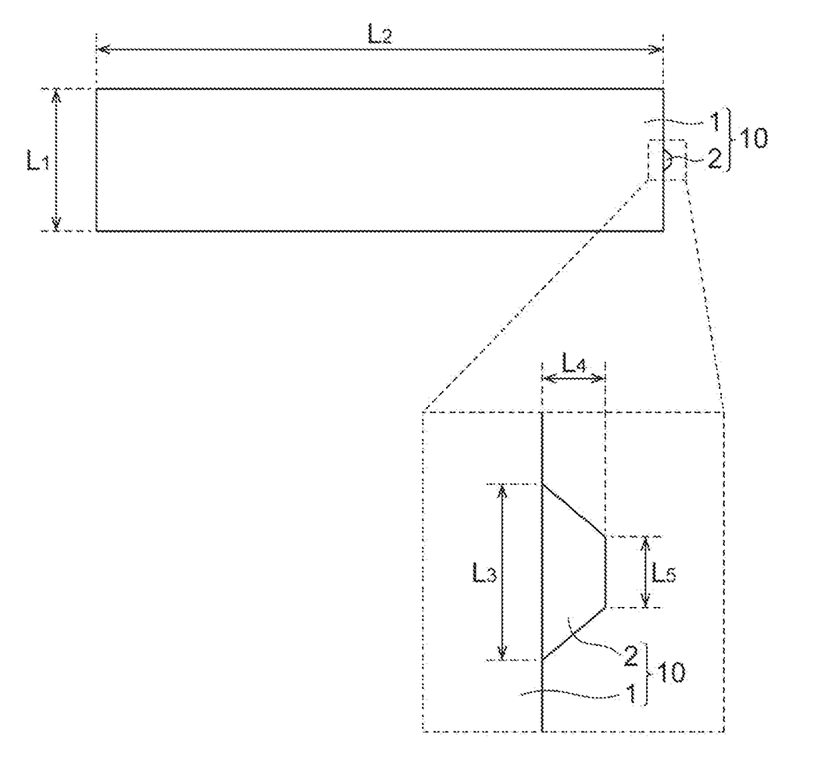
FIG. 1 is a schematic view of an injection molded article for evaluation.

The obtained resin compositions were injection molded under the following conditions, and injection molded articles for evaluation shown FIG. 1 were produced.

Injection molding machine: SE180D made by Sumitomo Heavy Industries, Ltd. (fastening force of 180 tons and cylinder diameter of 50 mm)
Shape of mold cavity: 100 mm (width)×400 mm (length)×3 mm (thickness)
Gate: one fan gate located at center of side face of 100 mm
Cylinder temperature: 220° C.
Mold temperature: 50° C.
Injection speed: 23 min/sec
Cooling time period: 30 seconds FIG. 1 is a schematic view of an injection molded article for evaluation. The injection molded article 10 shown in FIG. 1 is provided with a first resin portion 1 corresponding to a mold shape, and a second resin portion 2 corresponding to the gate shape. The first resin portion 1 is a plate-like resin portion of which the width $L_1$ is 100 mm, the length $L_2$ is 400 mm, and the thickness (not shown) is 3 mm. In addition, in the injection molded articles formed in the present example and comparative examples, the lengths $L_3$, $L_4$ and $L_5$, and the thickness (not shown) of each side of the second resin portion 2 were 15 mm, 5 mm, 4 mm, and 2 mm, respectively. Here, the main body portion of the injection molded article is the first resin portion 1 (where, hereinafter, portion corresponding to "first resin portion 1" is referred to also as "injection molded article").

(Evaluation of Dimensional Stability)

The dimensional stability was evaluated by an operation of measuring the coefficients of linear expansion by using the obtained injection molded articles. The coefficient of linear expansion was measured with the use of a thermomechanical analyzer TMA/SS 6100 made by SII Nanotechnology Co., according to the following method.

A test piece of 5×10×3 (mm) was cut out from the center portion in the longitudinal direction of the injection molded article. The test piece was set in the above described apparatus, and the temperature was raised from −20° C. to 130° C. at a rate of temperature rise of 5° C./min, and the residual strain at the time of molding was removed. After that, the test piece was set in the apparatus again so that the change in a dimension of an MD direction (direction of resin flow, and direction parallel to $L_2$ in FIG. 1) at the time of the injection molding or a TD direction (direction orthogonal to MD direction, and direction parallel to $L_1$ in FIG. 1) could be measured, and the dimension at 23° C. was accurately measured. The temperature was raised from −20 to 80° C. at a rate of temperature rise of 5° C./min, and the changes in the dimensions in the MD direction and the TD direction during the temperature rise were measured. The change in the dimension per unit length and unit temperature was determined as the coefficient of linear expansion. The coefficient of linear expansion means that the smaller the value is, the better the dimensional stability is. Table 1 and Table 2 show an average value (coefficient of MDTD average linear expansion) of the coefficient of linear expansion in the MD direction and the coefficient of linear expansion in the TD direction.

(Evaluation of Degree of Orientation)

In a similar way to the evaluation of the dimensional stability, a test piece was cut out from the injection molded article, then the test piece was cut out so as to be parallel to a plane including both of the MD direction and the thickness direction (ND direction) of the molded article, and a test piece 1 for the evaluation of a degree of orientation was prepared. In addition, in a similar way to the evaluation of the dimensional stability, a test piece was cut out from the injection molded article, then the test piece was cut out so as to be parallel to a plane including both of the TD direction and the ND direction, and a test piece 2 for the evaluation of a degree of orientation was prepared.

The test piece 1 for the evaluation of the degree of orientation was irradiated with X-rays from the TD direction, and a wide angle X-ray scattering profile was measured. The irradiation position was changed so that spots to be irradiated with the X-rays did not overlap each other in the ND direction, and six irradiation positions were irradiated with the X-rays within a range of 1.5 mm from the end in the ND direction; and six wide angle X-ray scattering profiles were obtained. The term "within a range of 1.5 mm from the end in the ND direction" is a range from the surface of the injection molded article to the center (portion of which the depth is 1.5 mm that is half of the thickness) in the ND direction. Similarly, in the test piece 2 for the evaluation of the degree of orientation was irradiated with X-rays from the MD direction, and a wide angle X-ray scattering profile was measured. The irradiation position was changed so that spots to be irradiated with the X-rays did not overlap each other in the ND direction, and six irradiation positions were irradiated with the X-rays within a range of 1.5 mm from the end in the ND direction; and six wide angle X-ray scattering profiles were obtained. Here, measurement conditions of the wide-angle X-ray scattering profile were set as follows.

<Measurement Condition>

Model: Micromax-007 (trade name) made by Rigaku Corporation

X-ray source: CuKα ray

Beam diameter: 250 μm

Voltage: 40 kV

Electric current: 20 mA

Detector: X-ray photon counting type two-dimensional detector PILATUS

Measurement Method: Transmission Method

In each of the obtained wide-angle X-ray scattering profiles, a distribution of the azimuth angle intensities was determined which were derived from a (040) plane of the α crystal of the component A. The half-width at each peak position was determined in a range of 0 to 360 degrees from the azimuth angle intensity distribution, and then the degree (%) of orientation of the b-axis of the α crystal in the component A was calculated according to the following expression (1).

$$\text{Degree of orientation (\%)} = \{(360 - \Sigma hw_{040})/360\} \times 100 \quad (1)$$

In Expression (1), $\Sigma hw_{040}$ represents the total value of the half-widths (unit: degrees) of all the peaks derived from a (040) plane of the component A, in a range of 0 to 360 degrees of the azimuth angle intensity distribution curve.

The average value (average value of 12 points) of the obtained degrees of orientation (%) was calculated, and thereby the degree of orientation of the b-axis of the α crystal in the component A (average value of degree of orientation that was obtained by wide-angle X-ray analysis in which X-rays incident on two directions that were vertical to the thickness direction of molded article and orthogonal to each other) (%) was calculated. The results are shown in Table 1 and Table 2.

TABLE 1

|  | Example 1 | Example 2 | Comparative Example 1 | Comparative Example 2 |
| --- | --- | --- | --- | --- |
| A-1 (part by mass) | — | — | 20 | — |
| A-2 (part by mass) | — | 20 | — | 20 |
| A-3 (part by mass) | 27 | — | — | — |
| A-5 (part by mass) | — | — | 47.5 | 47.5 |
| A-6 (part by mass) | 40.5 | 47.5 | — | — |
| B-1 (part by mass) | 16 | 16 | 16 | 16 |
| B-2 (part by mass) | 16.5 | 16.5 | 16.5 | 16.5 |
| C-1 (part by mass) | 33 | 33 | 33 | 33 |
| Degree (%) of orientation of b-axis in α crystal of component A | 86.0 | 85.8 | 83.4 | 84.9 |
| Coefficient of MDTD average linear expansion ($10^{-5}/°$ C.) | 3.75 | 4.07 | 4.84 | 4.54 |

TABLE 2

|  | Example 3 | Comparative Example 3 |
| --- | --- | --- |
| A-4 (part by mass) | 32.5 | 32.5 |
| A-5 (part by mass) | — | 35.0 |
| A-6 (part by mass) | 35.0 | — |
| B-1 (part by mass) | 16 | 16 |
| B-2 (part by mass) | 16.5 | 16.5 |
| C-1 (part by mass) | 33 | 33 |
| Degree (%) of orientation of b-axis in α crystal of component A | 85.7 | 84.9 |
| Coefficient of MDTD average linear expansion ($10^{-5}/°$ C.) | 3.97 | 4.42 |

It is understood from Table 1 and Table 2 that the injection molded article according to the Example has a low coefficient of MDTD average linear expansion and is excellent in the dimensional stability. In other words, it has been confirmed that according to the propylene resin composition of the present embodiment, a molded article excellent in the dimensional stability can be produced by injection molding and that the injection molded article of the present embodiment is excellent in the dimensional stability.

This application claims priority from Japanese patent application No. 2017-080587 (filed on Apr. 14, 2017), the entire disclosure of which is incorporated herein by reference.

REFERENCE SIGNS LIST

1 . . . first resin portion, 2 . . . second resin portion, and 10 . . . injection molded article.

What is claimed is:

1. A propylene resin composition comprising:

a propylene-based polymer (A); and an ethylene-α-olefin copolymer (B), the ethylene-α-olefin copolymer (B) not containing a monomer unit derived from propylene, wherein a content of the propylene-based polymer (A) and a content of the ethylene-α-olefin copolymer (B) are 60 to 90 parts by mass and 10 to 40 parts by mass, respectively, with respect to 100 parts by mass in total of the propylene-based polymer (A) and the ethylene-α-olefin copolymer (B), and a degree of orientation of a b-axis in an α crystal of the propylene-based polymer (A) in a molded article is 85.0% or more, wherein the molded article is obtained by injection molding the propylene resin composition into a mold cavity of 100 mm (width)×400 mm (length)×3 mm (thickness) under conditions of a cylinder temperature of 220° C., a mold temperature of 50° C. and an injection speed of 23 mm/sec, and the degree of orientation is an average of degrees of orientation obtained by a wide-angle X-ray analysis where X-rays are incident on two directions vertical to a thickness direction of the molded article and orthogonal to each other, and wherein the propylene-based polymer (A) contains a heterophasic propylene polymer material comprising a polymer (II) containing monomer units derived from propylene and a monomer unit derived from at least one α-olefin selected from the group consisting of ethylene and α-olefins having 4 or more and 12 or less carbon atoms dispersed in a matrix of a polymer (I) containing 80% by mass or more of a monomer unit derived from propylene, provided that total mass of polymer (I) is 100% by mass, and the content of the polymer (II) in the heterophasic propylene polymer material is more than 0% by mass and no more than 40% by mass when the content of the ethylene-α-olefin copolymer (B) contained in the propylene resin composition is 100% by mass;

wherein the ethylene-α-olefin copolymer (B) is a copolymer that contains a monomer unit derived from ethylene and a monomer unit derived from an α-olefin having 4 to 12 carbon atoms, and when the total mass of the ethylene-α-olefin copolymer (B) is 100% by mass, the total of the contents of the monomer units derived from ethylene and the monomer units derived from an α-olefin having 4 to 12 carbon atoms and contained in the ethylene-α-olefin copolymer (B) is 100% by mass.

2. The propylene resin composition according to claim 1, further comprising a filler (C), wherein a content of the filler (C) is 1 to 65 parts by mass, with respect to 100 parts by mass in total of the propylene-based polymer (A) and the ethylene-α-olefin copolymer (B).

3. The propylene resin composition according to claim 2, wherein a ratio of D50[L]/D50[S] of the filler (C) is 2.5 to 10, wherein D50[L] is an average particle diameter of the filler (C) which is a 50% equivalent particle diameter measured by a laser diffraction method according to JIS R 1629, and D50[S] is an average particle diameter of the filler (C) which is a 50% equivalent particle diameter measured by a centrifugal sedimentation method according to JIS R 1619.

4. The propylene resin composition according to claim 1, wherein a ratio of Mw/Mn of the polymer (I) in the heterophasic propylene polymer material is 6.0 or more, wherein Mw is a weight average molecular weight and Mn is a number average molecular weight.

5. An injection molded article comprising the propylene resin composition according to claim 1.

6. An injection molded article comprising the propylene resin composition according to claim 2.

7. An injection molded article comprising the propylene resin composition according to claim 3.

8. An injection molded article comprising the propylene resin composition according to claim 4.

* * * * *